US008028096B2

(12) United States Patent
Brune et al.

(10) Patent No.: US 8,028,096 B2
(45) Date of Patent: Sep. 27, 2011

(54) METHOD FOR USING THE HAND-HELD DEVICE IN A MULTIMEDIA HOME NETWORK

(75) Inventors: Thomas Brune, Hannover (DE); Dirk Adolph, Ronnenberg (DE); Axel Kochale, Springe (DE); Andrei Chevtsov, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 778 days.

(21) Appl. No.: 10/363,907

(22) PCT Filed: Sep. 3, 2001

(86) PCT No.: PCT/EP01/10122
§ 371 (c)(1),
(2), (4) Date: Mar. 6, 2003

(87) PCT Pub. No.: WO02/23860
PCT Pub. Date: Mar. 21, 2002

(65) Prior Publication Data
US 2003/0171135 A1 Sep. 11, 2003

(30) Foreign Application Priority Data
Sep. 15, 2000 (EP) .................................. 00120080

(51) Int. Cl.
*G06F 15/16* (2006.01)
*G06F 9/44* (2006.01)
*G06F 9/445* (2006.01)

(52) U.S. Cl. ........ 709/248; 709/208; 709/209; 709/217; 709/219; 709/227; 717/168; 717/169; 717/170; 717/171; 717/172; 717/173; 717/174; 717/176; 717/177; 717/178

(58) Field of Classification Search ............... 455/422.1, 455/566, 569; 709/224, 227, 208, 209, 217, 709/219, 248; 717/168, 169, 170, 171, 172, 717/173, 174, 176, 177, 178
See application file for complete search history.

(56) References Cited

U.S. PATENT DOCUMENTS
5,542,069 A * 7/1996 Meppelink et al. ............. 703/17
(Continued)

FOREIGN PATENT DOCUMENTS
WO 00/49731 8/2000

OTHER PUBLICATIONS

S. Gessler et al "PDA's As Mobile WWW Browsers", Computer Networks and ISDN Systems, vol. 28, No. 1, Dec. 1, 1995, pp. 53-59.

(Continued)

*Primary Examiner* — John Follansbee
*Assistant Examiner* — Saket K Daftuar
(74) *Attorney, Agent, or Firm* — Robert D. Shedd; Paul P. Kiel

(57) ABSTRACT

The present invention relates to a hand-held device comprising connection means for supporting an internet data transmission link between the hand-held device and the internet; browser means for fetching internet data from the internet; input means for receiving a user input; and generating means for generating a command script in response to said user input, where said command script is related to said searched internet data; where said command script, when the hand-held device is connected to a multimedia home device, can be processed to initiate a transmission of at least part of said searched internet data and/or other internet data to said multimedia home device.

16 Claims, 2 Drawing Sheets

U.S. PATENT DOCUMENTS

| | | | |
|---|---|---|---|
| 5,793,982 A * | 8/1998 | Shrader et al. | 709/232 |
| 5,809,415 A * | 9/1998 | Rossmann | 455/422.1 |
| 6,078,322 A * | 6/2000 | Simonoff et al. | 715/744 |
| 6,087,952 A * | 7/2000 | Prabhakaran | 340/693.5 |
| 6,241,944 B1 * | 6/2001 | Budman | 422/4 |
| 6,463,463 B1 * | 10/2002 | Godfrey et al. | 709/206 |
| 6,463,464 B1 * | 10/2002 | Lazaridis et al. | 709/207 |
| 6,473,097 B1 * | 10/2002 | Elliott | 715/733 |
| 6,594,484 B1 * | 7/2003 | Hitchings, Jr. | 455/414.1 |
| 6,603,984 B2 * | 8/2003 | Kanefsky | 455/566 |
| 6,603,986 B1 * | 8/2003 | Bozoukov | 455/569.2 |
| 6,625,447 B1 * | 9/2003 | Rossmann | 455/426.1 |
| 6,633,314 B1 * | 10/2003 | Tuli | 715/744 |
| 6,633,746 B1 * | 10/2003 | Walsh et al. | 340/7.55 |
| 6,654,359 B1 * | 11/2003 | La Porta et al. | 370/328 |
| 6,690,403 B1 * | 2/2004 | Tuli | 715/854 |
| 6,701,378 B1 * | 3/2004 | Gilhuly et al. | 709/249 |
| 6,728,753 B1 * | 4/2004 | Parasnis et al. | 709/203 |
| 6,735,630 B1 * | 5/2004 | Gelvin et al. | 709/224 |
| 6,832,251 B1 * | 12/2004 | Gelvin et al. | 709/224 |
| 6,859,831 B1 * | 2/2005 | Gelvin et al. | 709/224 |
| 6,874,009 B1 * | 3/2005 | Tuli | 709/203 |
| 7,010,603 B2 * | 3/2006 | Martin et al. | 709/227 |
| 7,020,685 B1 * | 3/2006 | Chen et al. | 709/204 |
| 7,020,701 B1 * | 3/2006 | Gelvin et al. | 709/224 |
| 7,035,914 B1 * | 4/2006 | Payne et al. | 709/219 |
| 7,054,626 B2 * | 5/2006 | Rossmann | 455/422.1 |
| 7,330,875 B1 * | 2/2008 | Parasnis et al. | 709/204 |

OTHER PUBLICATIONS

K.F. Eustice et al. "A Universal Information Appliance" IBM Systems Journal, IBM Corp., vol. 38, No. 4, 1999, pp. 575-601.

* cited by examiner

METHOD FOR USING THE HAND-HELD DEVICE IN A MULTIMEDIA HOME NETWORK

This application claims the benefit, under 35 U.S.C. §365 of International Application PCT/EP01/10122, filed Sep. 3, 2001, which was published in accordance with PCT Article 21(2) on Mar. 21, 2002 in English and which claims the benefit of European patent application No. 00120080.7 filed Sep. 15, 2000.

BACKGROUND OF THE INVENTION (1) Field of the Invention

The invention relates to a hand-held device comprising means for data exchange with a network, in particular for data exchange with the world wide web (internet), and a method for using the hand-held device.

(2) Related Art

There are hand-held devices with internet-surfing capabilities, e.g. mobile phones, Palm Pilot®. Internet-surfing capability is provided by so-called browser means stored as an executable code in the hand-held device's memory. The information is transmitted between internet servers and the hand-held device preferably by means of wireless or radio connections.

With the hand-held device a user is able to receive information from the internet twenty four hours a day at nearly any place. While surfing in the internet with the hand-held device, the user will visit different internet pages or locations which may be sources for information usable for multimedia home devices, e.g. system updates for a video recorder, audio/video data, etc. Therefore, the user who is surfing in the internet by means of the hand-held device, may desire to use that information later with the respective multimedia home device.

BRIEF SUMMARY OF THE INVENTION

It is an object of the present invention to disclose a hand-held device and a method for using the hand-held device providing an opportunity that allows a user of the hand-held device to use internet data for multimedia home devices more comfortable and in a more time saving fashion.

According to one aspect of the present invention a hand-held device is provided, the hand-held device comprising:
  connection means for supporting an internet data transmission link between the hand-held device and the internet;
  browser means for fetching internet data from the internet;
  input means for receiving a user input; and
  generating means for generating a command script in response to said user input, where said command script is related to said searched internet data;
where said command script, when the hand-held device is connected to a multimedia home device, can be processed to initiate a transmission of at least a part of said searched internet data and/or other internet data to said multimedia home device.

According to another aspect of the present invention a method for transmitting internet data to a multimedia home device is provided, the method comprising the steps of:
  searching internet data in the internet by browser means of a hand-held device;
  in response to a user input, generating a command script by generating means of said hand-held device, where said command script is related to said searched internet data; and
  after finishing said internet data search, when said hand-held device is connected to said multimedia home device, processing said command script.

The invention comprises the basic idea of fetching data/information from the internet referred to as "net-surfing" by means of a browser installed on a hand-held device and generating a command script relating to the fetched data/information, in order to use the command script later, when the hand-held device is connected to a multimedia home device. The command script is an executable code. The hand-held device may be connected to the multimedia home device by a wireless connection.

This opens to a user of the hand-held device the opportunity to surf in the internet at any time and to use information gathered during net-surfing for optimising functionality of the multimedia home device. The multimedia home device may be part of a home network.

Storage means of the hand-held device can be minimised, since it is not necessary to store searched internet data on the hand-held device. Storing of internet data searched may be performed later when the hand-held device is connected to the multimedia home device.

Advantageous features of the present invention according to the independent claims are disclosed in associated dependent claims.

BRIEF DESCRIPTION OF THE SEVERAL VIEWS OF THE DRAWINGS

Exemplary embodiments of the invention are explained in more detail in the following description with reference to drawings.

In the drawings.

DETAILED DESCRIPTION OF THE INVENTION

Figure 1:
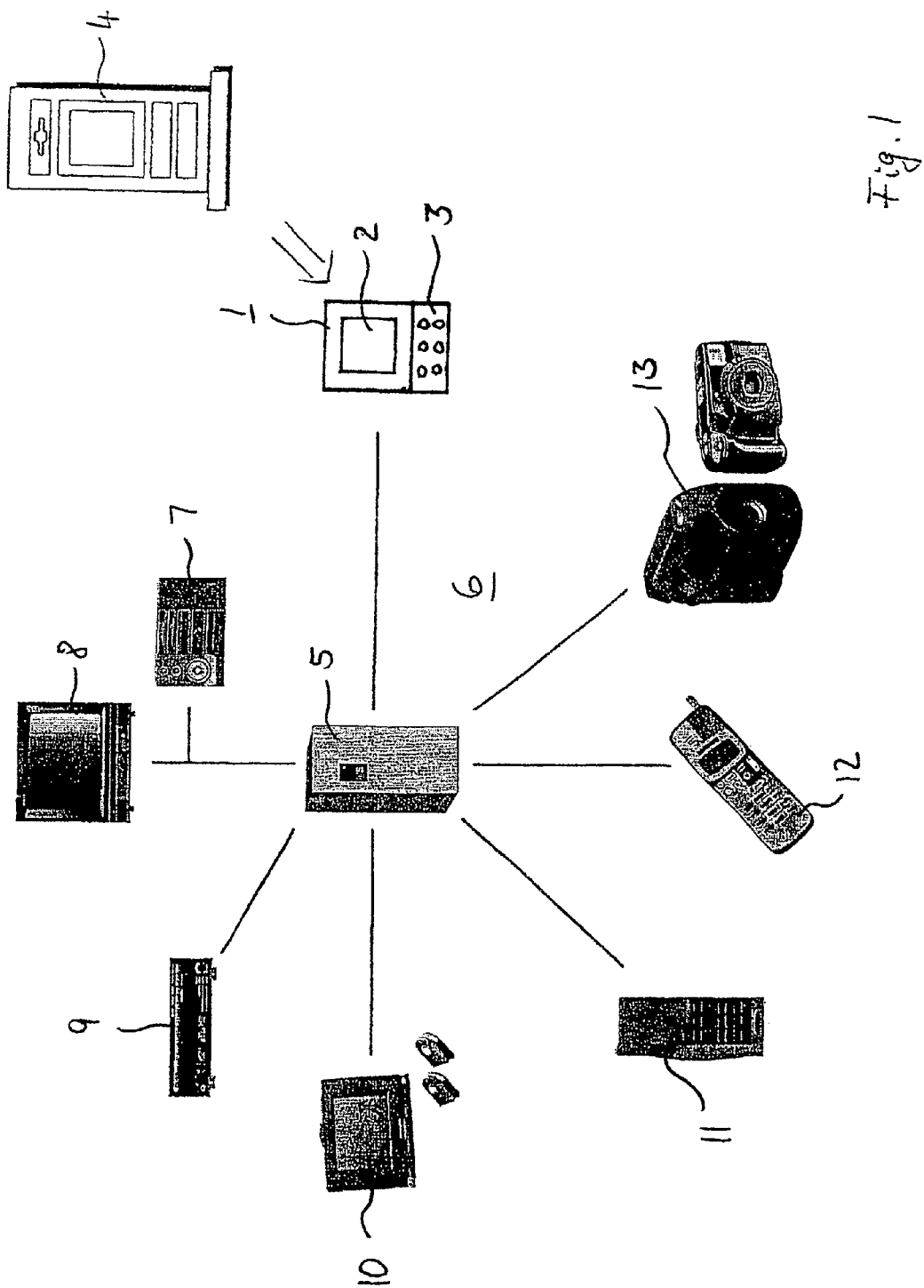
FIG. 1 shows a representation of an arrangement of a hand-held device and a multimedia home network.

Referring to FIG. 1, a hand-held/portable device 1 comprises a display 2 for graphically outputting information and a keyboard 3. In another embodiment (not shown), the hand-held device 1 may have a touch screen instead of the keyboard 3.

The hand-held device 1 is configured to be connected with an server 4 of the world wide web also referred to as internet. A browser is installed on the hand-held device 1 to fetch internet data from the internet server 4. The hand-held device comprises a memory for storing internet data downloaded from the internet server 4.

By means of an intelligent interface unit the hand-held device 1 can be connected to a central server 5 of a multimedia home network 6. The hand-held device 1 may be directly connected to the central server 5 or by means of a docking station (not shown). The central server 5 is connected to several multimedia home devices, e.g. an audio unit 7, a TV 8, a set-top box 9, a game unit 10, a MP3-player 11, a mobile phone 12 and a camera 13. The central server 5 may comprise a central memory and/or a central control unit commonly used by the several multimedia home devices of the multimedia home network 6. However, for data exchange, the hand-held device 1 can also be directly connected to one or more of the multimedia home devices. The intelligent interface unit or the docking station can be configured to link the hand-held device 1 to the central server 5 or to one or more of the multimedia home devices.

A number of resources suitable for the multimedia home devices may be available from the internet server 4. For example, there may be software updates, operating systems as well as audio files, e.g. MP3-files fetchable from the internet server 4. The hand-held device 1 comprises only limited memory space. Therefore, rather then downloading internet data from the internet server 4 into the memory of the hand-held device 1, a command script is generated on the hand-held device 1 in response to a user's input by the keyboard 3. The command script can be processed to download internet data from the internet server 4 to the central server 5 and/or into the memory of one or more of the multimedia home devices. Processing of the command script is initiated by an executing machine, e.g. a software code, installed on the hand-held device 1 or the central server 5 or one of the multimedia home devices. In any case, the executing machine has to translate the command script into a protocol, e.g. IEEE 1394 (see below) supported by the multimedia home network 6.

Figure 2:
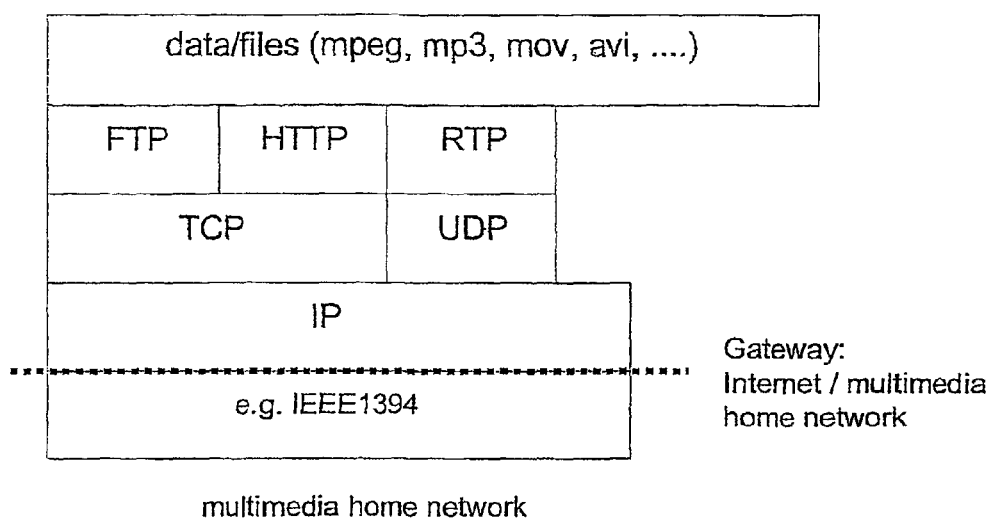
FIG. 2 shows an example of a protocol used by an interface unit of the hand-held device.

The intelligent interface unit or docking unit must support a bus protocol used in the multimedia home network 6. The bus protocol of the home network may be the Internet Protocol (IP) over IEEE1394 and upper layers within the IP, like the Transmission Control Protocol (TCP), the User Datagram Protocol (UDP) or the File Transfer Protocol (FTP) (see FIG. 2). The IP is used for addressing data packets and for optimal fitting the data packet size to the respective network. Additionally, a fragmentation of packets can be performed. TCP and UDP on top of IP act as a transport layer. UDP is non-connection oriented while TCP is connection oriented. UDP/IP packets are considered as individual datagrams. Applications using UDP are themselves responsible to check existence and sequence of packets that are expected to arrive. Applications using TCP benefit from a guaranteed transport, including the checking of the order of arriving IP packets and the resending of IP packets lost.

The objectives of FTP are (i) to promote sharing of files (computer programs and/or data), (ii) to encourage indirect or implicit (via programs) use of remote computers, (iii) to shield a user from variations in file storage systems among hosts, and (iv) to transfer data reliably and efficiently. FTP, though usable directly by a user at a terminal, is designed mainly for use by programs.

In the following some examples for commands which may be used in the command script are describe. The commands are related to an internet-link, e.g. 'http://www.xyz/movie.mpg' or files on local storage means. The commands are exemplary named according to their respective function:

1) Download at Home; Destination: xxx
   'xxx' may be the central server 5 (cf. FIG. 1). With this command, downloading of the internet-file will be performed if the hand-held device 1 is connected with the multimedia home network 6. If the internet-link, for example, leads to an update of an operating system for the TV 8 and 'xxx' identifies a special execution channel of the TV's 8 hardware, downloading of the update of the operating system will be automatically done when the hand-held device 1 is connected to the multimedia home network 6.

2) Download Now
   This command has a function like it is provided by browsers known in the art. The internet file is stored in the memory space of the hand-held device 1. It is afterwards possible to copy/move the internet file from the memory space of the hand-held device 1 to multimedia home network 6 (cf. the following paragraph).

3) Store at Home; Destination: xxx' or Generally Synchronizing the Multimedia Home Network 6
   Using this command, when the hand-held device 1 is connected to the multimedia home network 6, a selected file will be moved/copied from the memory space of the hand-held device 1 to the multimedia home network 6.
   Alternatively, when the hand-held device 1 is connected to the multimedia home network 6, all fetched data files will be synchronised/updated with the multimedia home network 6 by asking the user of the hand-held device 1 for the destination of every new data file.

4) See/Listen to a Broadcast of a Movie/Radio-Show/Internet-Chat/Internet-Conference at <Time> on Channel <Internet-Channel/TV-Channel/Radio-Channel>
   In case of this command, the hand-held device will update it's calendar. There three scenarios possible:
   i) The hand-held device 1 is connected to the multimedia home network 6 at <time>: In this case, a multimedia home network remainder will ask at <time> for confirmation of taking part 'live' and/or for recording the movie/radio-show.
   ii) The hand-held device 1 is connected to the multimedia home network 6 before <time> and is going to be disconnected before <time>: In this case, before being disconnected, the hand-held device 1 will ask for recording the movie/radio-show identified in the command script.
   iii) At any time before <time>, the hand-held device 1 was not connected to the multimedia home network 6: In this case, the hand-held device 1 will ask whether a connection should be established between the hand-held device 1 and the internet link identified in the command script at <time> (restricted to internet events), or whether it should initiate the recording in the multimedia home network 6 by remote access, i.e. the hand-held device initiates recording by data exchange with the multimedia home network 6.

A multimedia home network remainder, for example, means that all TVs 8 will display messages or all audio units 7 will give an acoustic note.

A command script is a sequence of one or more commands sequentially executed by the executing machine installed on the hand-held device 1, the central server 5, the docking station or one of the units of the multimedia home network 6, for example. Command scripts may look like the following examples:

```
>>download_at_home -destination:video-db/ -source:
   <http://www.xyz/movie.mpg>
>>download_at_home -destination:audio-db/classic -source:
   <http://www.xyz/prelude.mp3>
>>store_at_home -destination:audio-db/rock -source:
   d:/highway_to_hell.mp3
>>see_listen_broadcast -at<8.30pm> -on_channel<BBC>
>>see_listen_broadcast -at<2.00pm> -
   on_channel<http://www.chat/conference.html>
```

The invention claimed is:
1. Hand-held device comprising
connection means for supporting an internet data transmission link between the hand-held device and the internet;
browser means for surfing the internet;
input means for receiving a user input;
generating means for generating a command script in response to said user input, wherein said command script is a sequence of one or more commands related to found internet data that corresponds to data found while surfing the internet and wherein said command script can be processed to initiate a transmission of at least part of said found internet data or data related to said found internet data to a multimedia home device;

means for enabling processing of said command script at a later time when the hand-held device is connected to said multimedia home device; and interface means for handling data exchange with said multimedia home device.

2. The hand-held device according to claim 1, wherein said connection means comprise means for supporting data transmission between said hand-held device and a mobile phone, where said mobile phone is capable of receiving internet data from an internet provider means and of transmitting internet data received from said internet provider means to the hand-held device.

3. The hand-held device according to claim 1, wherein said connection means comprise a transceiving unit for direct communication between the hand-held device and said internet provider means.

4. The hand-held device according to claim 1, wherein said browser means are configured to comprise said generating means.

5. The hand-held device according to claim 1, wherein said interface means are configured to handle data exchange with a multimedia home network, when said multimedia home device is part of said multimedia home network.

6. The hand-held device according claim 1, the hand-held device further comprising storage means for storing said found internet data, wherein internet data stored in said storage means, in response to processing of said command script, can be at least partly transmitted from said storage means to said multimedia home device, when the hand-held device is connected to said multimedia home device.

7. The hand-held device according to one of the preceding claims, the hand-held device further comprising execution means for executing said command script.

8. A method for transmitting data from a hand-held device to a multimedia home device, the method comprising the steps of:

searching internet data in the interne by browser means of a hand-held device;

generating a command script by generating means of said hand-held device in response to a user input, wherein said command script is a sequence of one or more commands related to said searched internet data; and processing said command script at a later time after finishing said internet data search, when said hand-held device is connected to said multimedia home device.

9. The method according to claim 8, wherein the step of processing said command script comprises a step of downloading to said multimedia home device at least part of said searched internet data or internet data related to said searched internet data.

10. The method according to claim 8, wherein said searched internet data or said internet data related to said searched internet data are at least partly downloaded to storage means of said hand-held device, and wherein the step of processing said command script comprises a step of transmitting from said storage means to said multimedia home device at least part of said searched internet data or said other internet data.

11. The method according to claim 8, wherein the step of processing said command script comprises a step of programming said multimedia home device.

12. The method according to claim 11, wherein said step of programming is configured to program said multimedia home device for executing an action at a predefined time.

13. The method according to claim 8, wherein the step of processing said command script is performed by execution means comprised in said hand-held device or said multimedia home device.

14. The method according to claim 13, wherein the step of processing said command script is performed by said execution means automatically after connecting said hand-held device to said multimedia home device.

15. The method according to claim 8, wherein said command script is generated while said searching of internet data in the internet is continuing.

16. The method according to claim 11, wherein said processing comprises recording of broadcast data.

* * * * *